FREQUENCY-SELECTIVE LIMITER USING DIRECT SUBHARMONIC GENERATION

Filed Sept. 12, 1967

INVENTORS
ATTILIO J. GIAROLA
DARRELL R. JACKSON
ROGER W. ORTH
WILLIAM P. ROBBINS

BY Christensen, Sanborn & Matthews
ATTORNEYS

United States Patent Office 3,506,933
Patented Apr. 14, 1970

3,506,933
FREQUENCY-SELECTIVE LIMITER USING DIRECT SUBHARMONIC GENERATION

Attilio J. Giarola, Seattle, Darrell R. Jackson, Mercer Island, and Roger W. Orth and William P. Robbins, Seattle, Wash., assignors to The Boeing Company, Seattle, Wash., a corporation of Delaware Filed Sept. 12, 1967, Ser. No. 667,119
Int. Cl. H04b *3/04;* H03h *9/22*
U.S. Cl. 333—17 10 Claims

ABSTRACT OF THE DISCLOSURE

A frequency-selective limiter is disclosed which includes a bandpass filter circuit having input and output terminals and tuned to pass signal frequency components within a predetermined frequency band. A body of material capable of acoustic resonance at a large number of "subharmonic" frequencies substantially equal, respectively, to one-half the frequencies within the frequency band, and means in the filter circuit operable to generate a substantially uniform field in which the resonant body is immersed and which is proportional to a signal applied at the input terminals. The resonant body has a characteristic whereby variations in the field, in response to input signal variations traversing a predetermined threshold value, cause changes in elastic parameters of the body, generating subharmonic elastic waves therein with oscillations at the aforementioned half-frequencies, thereby diverting (absorbing and reflecting) the power contained in input signal components which exceed the threshold value. The generation of subharmonic frequencies is direct, and does not require coincidence of conditions, producing ordinary resonance and subharmonic resonance together. Circuit details using piezoelectric and magnetostrictive materials are provided.

Background of the invention

This invention relates to frequency-selective limiters; that is, limiters having the capability of limiting or rejecting signals above a threshold value without affecting those signals which are of magnitude less than the threshold level. In particular, the invention relates to a frequency-selective limiter based on acoustic resonance effects utilizing materials capable of subharmonic resonance to effect absorption and reflection of input signal energy above a threshold value, thereby limiting input signal power passed to the output of the limiter. While the invention is herein described in terms of preferred forms thereof, various modifications and changes within the scope of the principles involved will be recognized by those skilled in the art.

An ideal limiter is one having a linear response below a certain threshold value and giving a constant output above that threshold. All actual limiters are constructed to approach this ideal response characteristic so as to pass without distortion all signals below the threshold value, but to divert the power contained in signals above the threshold value to some other destination by absorption, reflection or otherwise.

Two general types of limiters should be mentioned in connection with this invention: the gyromagnetic resonance type limiter and the so-called coincidence mode ferrite limiter. The gyromagnetic resonance limiter is described in the R. H. Varian U.S. Patent No. 3,147,427, Sept. 1, 1964. Varian describes a frequency-selective limiter wherein a body of gyromagnetic material is placed within a field generated between crossed coils. The field is uniform and in response to an applied input signal the nuclei of the material precess at a certain frequency, known as the Larmor frequency. Limiting action is obtained by absorption of energy contained in signals exceeding a critical threshold amplitude which effects *gyromagnetic* resonance in the material. The saturation phenomenon which occurs at resonant frequencies limits the passage of signals so that an increase in incident power results in no further increase in output power.

An improvement in the gyromagnetic resonance type of system is described in the copending application of Darrell R. Jackson and Roger W. Orth, Ser. No. 556,536, filed May 27, 1966, now U.S. Patent No. 3,378,760 wherein the disclosed limiter includes reactance compensation means permitting selective attenuation of interfering signals lying within a relatively wide bandwidth of some desired signal spectrum.

The coincidence mode ferrite limiter operates in the microwave frequency range and makes use of the nonlinear effects in ferrimagnetic material. Specifically, the device described by K. L. Kotzebue in "Frequency-Selective Limiting," IRE Transactions on Microwave Theory and Techniques, vol. MTT-10, pp. 516–520 (November 1962) achieves a coincidence condition (of both frequency and magnetic field) between saturation of the main ferrimagnetic resonance occurring in the material and the appearance of the second or subsidiary absorption which occurs above a certain power level. The subsidiary absorption results from the excitation of spin waves within the material which become unstable at power levels above the threshold value and resonate at one-half the frequencies of the incident signal components.

The Kotzebue coincidence mode ferrite limiter utilized a highly polished ferrimagnetic sphere placed between two orthogonal conductors biased to resonance by a D.C. magnetic field. Until the coincidence condition was reached and resonance occurred in the ferrimagnetic sphere, no coupling existed between the two orthogonal conductors. At resonance the conductors were heavily coupled through the ferrite resonator, since the precessing magnetic moment within the material induced the necessary transverse magnetic field components. Provided the input signal frequency components were separated by a minimum amount, the described limiter provided independent limiting without serious distortions of signals below the threshold value in the presence of saturating signals. However, a prerequisite for the operation of the coincidence mode limiter is, by its nature, that coincidence be achieved between ferrimagnetic resonance at the input signal frequencies and subharmonic resonance at half the input signal frequencies by excitation of spin waves within the resonant material.

The instant invention also utilizes a type of so-called subharmonic resonance to effect limiting in the microwave range of frequencies and below. In direct contrast to the coincidence mode limiter described by Kotzebue, however, input signal power is coupled directly to generate subharmonic frequencies for absorption of power above a predetermined threshold level, without producing resonance at the frequencies of the input signal at the output. Stated in another way, the circuit of the present invention acts primarily as a bandpass filter for all signals having amplitudes less than the throshold value and having frequencies within the passband of the device, but acts as a blocking device with respect to signal components exceeding the threshold value, diverting the excess incident power so as to limit output signal power to the threshold value.

Basically, the instant device is an electromechanical resonator which resonates at subharmonic frequencies when signals above a certain threshold value are applied to the coupling circuit. The resonant material is placed and oriented in a field responsive to input signal frequencies in the passband of the device. However, it differs from ordinary acoustic resonators in a number of respects. Acoustic resonators are not used as limiters, though they are frequently used as frequency control devices and filters, and they are always tuned to respond to the input signal frequencies which the device is supposed to pass. In the instant device variations in the field applied to the resonant material cause changes in elastic constants thereof, generating subharmonic elastic waves or parametric oscillaitons at the half frequencies. This later phenomenon also distinguishes the invention from the coincidence mode limiters in which spinwave subharmonic resonance is achieved by obtaining conditions for magnetic resonance at input signal frequencies. In the instant device it is only subharmonic resonance which is active above the threshold value to cause absorption of power so that the output power is limited to the threshold value at which such resonance occurs.

Accordingly, it is the primary object of this invention to provide a frequency-selective limiter based on generation of only subharmonic frequencies in an electromechanically resonant body.

Another object hereof is to provide a wide bandwidth limiter capable of relatively simple, lightweight construction for use in applications where space and weight are critical features.

These and other features, objects and advantages of the invention will be more fully understood from the following detailed description taken in connection with the accompanying drawings which illustrate preferred embodiments of the invention.

Detailed description of preferred embodiments of the invention

One of the principal uses of this invention is as an anti-interference device for independently limiting large interfering signals occurring within the signal passband of a communication system, a radar receiver, or the like, enabling reception of signals which would otherwise be lost in interference. As discussed previously, devices currently available which performs a similar function include gyromagnetic resonance limiters and coincidence mode ferrite limiters. The latter are generally unsuited for most anti-interference applications because they lack sufficient selectivity and hense cause excessive distortion of desired signals. Gyromagnetic resonance limiters produce little distortion but require the use of bulky and expensive magnets.

Referring again to the subharmonic resonance described by Kotzebue, the subharmonic oscillations can be thought of as involving a plurality of oscillators tuned to resonate in separate narrow frequency bands with no cross coupling. Hence there is no power exchange between them. Each subharmonic oscillator causes limiting by absorbing the energy of a signal whose half frequency falls within its subharmonic band when the signal has an amplitude exceeding a certain threshold value. Such limiting is referred to as being frequency-selective. Frequency-selective limiting of a large number of signals of different frequencies may be accomplished by using a large number of subharmonic oscillators, with frequencies chosen to cover an entire band of signal half-frequencies.

In the known ferrite limiter, the subharmonic oscillators thus visualized are associated with spinwave resonance modes in the ferrite resonator. These occur in the manner illustrated in FIGURE 1. An input signal of frequency $f_0$ is applied to input circuit 10 which includes means 12 providing direct linear coupling to a body of material capable of magnetic resonance at the frequency of the input signal. The coupling is achieved by placing the body in a magnetic field proportional to the input signal. As the input signal value increases, saturation of the main ferrimagnetic resonance occurs and a secondary "subsidiary" absorption of energy above a certain power level appears. This phenomenon has been attributed to the excitation of spin waves within the material, which become unstable above a certain threshold value and oscillate at one-half the frequency of the incident signal power. The oscillations grow in amplitude to absorb additional incident power above the threshold value.

Figure 1:
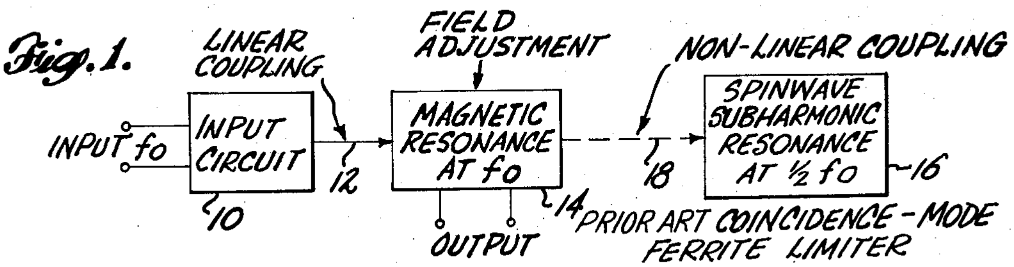
FIGURE 1 is a block diagram illustrating the types of resonance occurring in a known coincidence mode frequency-selective limiter.

In FIGURE 1 the magnetic resonance at $f_0$ is indicated by block 14, while the spinwave resonance at $\frac{1}{2}f_0$ is indicated by block 16, and the nonlinear effect causing the spinwave subharmonic resonance is indicated by arrow 18. When conditions for simultaneous existence of the main ferrimagnetic resonance at $f_0$ and the spinwave resonance at $\frac{1}{2}f_0$ exist, then the subharmonic resonator is converting power at $f_0$ to power at $\frac{1}{2}f_0$, so that the output power is limited to the threshold value. Field adjustments may be made to achieve this coincidence condition.

Figure 2:
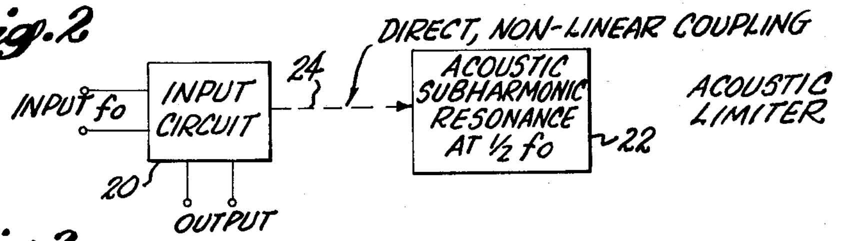
FIGURE 2 is a block diagram illustrating the manner in which subharmonic resonance is utilized in a frequency-selective limiter according to the invention.

The present invention achieves limiting by means of acoustic subharmonic resonance, as opposed to spinwave subharmonic resonance, in the manner diagrammatically illustrated in FIGURE 2. An input coupling circuit 20 having input and output terminals is coupled to a subharmonic resonant system represented by block 22 through direct nonlinear coupling 24, the function of which will be explained presently. When conditions discussed herein are met according to the invention, signals applied at the input terminals of circuit 20 are passed directly to its output terminals unless they exceed a predetermined threshold value, in which case the excess energy is absorbed or diverted by generation of subharmonic acoustic resonances in the system 22. While some of the excess energy is actually thermally absorbed in the material itself, portions may be reflected to the energy source or otherwise diverted from the output.

To achieve this effect an acoustic resonator rod 26 (FIGURE 3) to single-crystal ferrite or other suitable magnetostrictive material is suspended for free acoustic vibration in the uniform D.C. bias field of magnet poles 28 and 30, plus the uniform magnetic field of coil 32 which is proportional to the applied input signal and oriented parallel to the bias field. The acoustic resonator limits the current in the loop 34 so that the amplitudes of signals exceeding a certain threshold level are limited to that level and signal energies below that level are passed from input circuit 36 to output circuit 38, connected to the loop through impedance-matching inductive couplings 37 and 39, respectively.

The rod of magnetostrictive material is constructed of a size (volume) and coil 32 is appropriately tuned by capacitor 33 to establish conditions for subharmonic resonance as described hereafter. The bias field created by magnets 28 and 30 is oriented in a direction parallel to the magnetic field created by the coil 32 so that, in effect, the bias field is modulated by the input signal to which the magnetic field is proportional.

Figure 4:
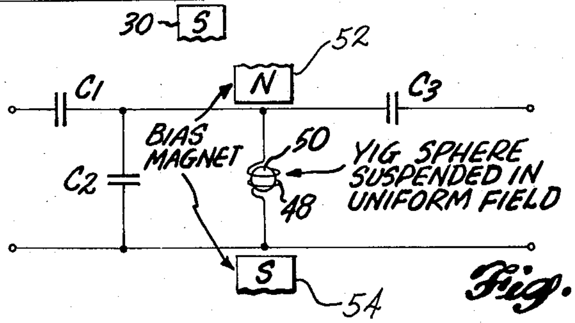
Figures 5, 6:
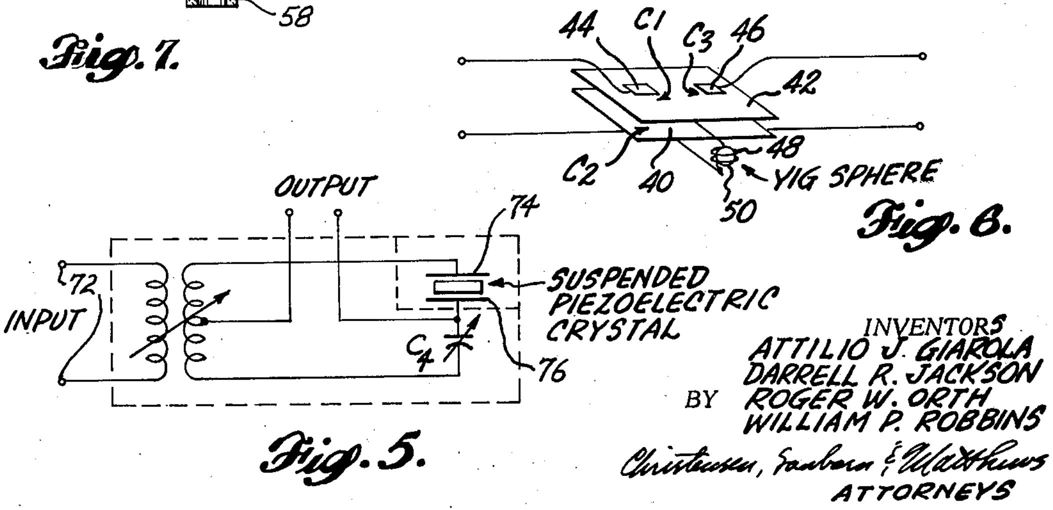
FIGURE 6 is a somewhat diagrammatic physical representation of the embodiment of the invention shown in schematic form in FIGURE 4.

The embodiment illustrated in FIGURES 4 and 6 consists of a pair of square plates 40 and 42 spaced apart in parallel to form a capacitor C2, with smaller parallel plates 44 and 46 spaced from plate 42 to form capacitors C1 and C3, respectively, which are connected to the input and output terminals to form a filter circuit. A coil 48 connected in parallel with capacitor C1 forms a uniform magnetic field in which a sphere 50 of yttrium iron garnet (YIG) is suspended for resonant vibration.

This circuit acts as a simple bandpass filter for signals whose magnitudes do not exceed the predetermined limiting threshold. When the input signal energy exceeds that value the excess energy is absorbed or diverted by generation of subharmonic resonances in the YIG sphere 50. The YIG sphere is immersed in the bias field of magnets 52 and 54 and coil 48 superimposes a varying magnetic field oriented in parallel with the biasing field. The system is tuned and the YIG sphere is oriented in the field and is constructed of a size (volume) for subharmonic resonance when the input signal exceeds the critical value. The crystal lattice is oriented with respect to the field to maximize the desired effect.

Ferrimagnetic material is characterized by spinning electrons which precess in an applied magnetic field at a characteristic frequency, known as the Larmor frequency, proportional to field intensity. The varying magnetic field exerts a varying amount of torque on the spinning electrons of the resonant material. This torque produces a stress which is greatest when the material is deformed from its unstrained condition. Thus the applied magnetic field produces a strain-dependent stress. Equivalently, it may be said that the application of the magnetic field changes the spring constant or the elastic modulus of the material by nonlinear magnetostriction. It may make the material more or less stiff, depending on whether the stress due to the field adds to or subtracts from the ordinary Hooke's law stress.

When field intensities exceed the critical value for the material, then further increases in incident energy cause such changes in the elastic modulus that a plurality of acoustic resonances occur in different modes simultaneously, absorbing or diverting the additional energy and generating elastic waves or oscillations which appear as acoustic vibrations in the material at frequencies equal to one-half the incident signal frequencies. The resonant body—the rod in FIGURE 3 or the sphere in FIGURES 4 and 6—becomes a sink, in effect, for the excess energy. The general term "*nonlinear coupling*" is used to describe the above phenomenon, signifying that the applied signal actually changes the elastic properties of the acoustic resonator, modulating its stiffness.

The resulting subharmonic resonance is not a "spin-wave resonance" like that which occurs in the coincidence mode ferrite limiter. In that case the RF magnetic field is applied in a direction orthogonal to the biasing field and the subharmonic resonance is a resonance of the spins, whereas in the present invention there is acoustic resonance of the entire body of material at subharmonic frequencies.

Figure 3:
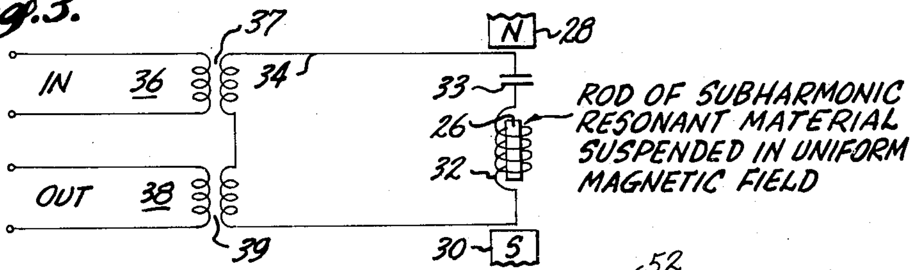
FIGURES 3, 4 and 5 are circuit diagrams of first, second and third embodiments of the invention.

The bias field must be sufficient to saturate the material so as to orient the "spins" in such a manner as to render it "single domain." This field must be such that the spin-wave resonance frequency is nearly equal to, but not coincident with, one-half the operating frequency. This is the condition under which the stiffness modulating effect of the field is greatest. Whereas in a coincidence mode ferrite limiter the system would be tuned for magnetic resonance at the Larmor frequency, in accordance with this invention the illustrated system is tuned for subharmonic resonance at a characteristic subharmonic frequency given by the following formulas:

$$\omega^{1/2}=\gamma H \quad (1)$$

for the rod in FIGURE 3, and $$\omega^{1/2}=\gamma[H^{4}/_{3}\pi M_{S}] \quad (2)$$

for the sphere in FIGURES 4 and 6, where $\gamma$ is the gyromagnetic ratio for the material, H represents the intensity of the applied field, and $M_s$ is the saturation magnetization of the material. These formulas hold for electron resonant material wherein a typical gyromagnetic ratio is 2.81, that is, one for which the Larmor frequency is 2.81 megacycles per oersted of applied field.

In order for the body of material to resonate when the threshold value is reached, it must have at least a certain minimum size which depends upon the characteristic of the material used, the operating frequency, and the mechanical quality factor of the acoustic modes in which the body is oscillating. For practical purposes the following formula indicates the minimum volume for the resonant body:

$$V>\frac{16U^3\pi^2Q}{\omega^3} \quad (3)$$

where U is the speed of sound in the material; Q is the mechanical quality factor for acoustic modes utilized, and $\omega$ is the operating frequency in radians per second. A typical size for a rod as illustrated in FIGURE 3 is 0.1 x 0.1 x 0.6 inches, while YIG spheres may range from 0.025 to 0.12 inch in diameter. Larger sizes may be used to obtain lower frequency responses.

Figure 7:
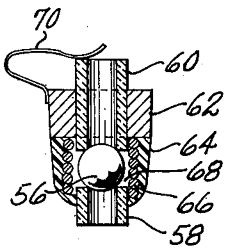
FIGURE 7 is a sectional side view of a typical mounting arrangement for the resonant sphere and coil of the resonator system according to the invention.

A typical mounting for the ferrimagnetic sphere within the field of the coil is shown in FIGURE 7. The sphere 56 is held between a first glass tubing element 60 held in place by a collar 62 and spring 70 and a second glass tubing element 58 held fixed by a bank of epoxy 64 in which is embedded the coil 66 coupled to the circuit so as to create a uniform magnetic field within the cavity 68. The internal rims of the tubes which engage the sphere along ring-shaped contact lines are normally not polished and therefore provide irregularly spaced points of contact with the sphere. This type of mounting, which is optional, provides relative freedom of movement for the sphere during subharmonic vibrations thereof. Other mountings may be devised for assuring that substantial freedom is provided for the sphere to resonate.

Typical materials for the sphere, besides yttrium iron garnet, are lithium ferrite or europium iron garnet. Other materials exhibiting the required properties are available or may be synthesized.

A third embodiment of the invention is illustrated in FIGURE 5 wherein a bridge circuit is disclosed having inductive couplings to input terminals 72 and having in one arm a pair of parallel plates 74 and 76 creating a uniform electric field therebetween. Within the field a flat disk of piezoelectric crystal material such as quartz or lithium niobate is suspended for acoustic subharmonic resonance. In this embodiment no bias field is needed. An adjustable capacitor C4 is provided for tuning purposes, and the inductive coupling at the input is also adjustable for tuning and impedance matching purposes.

The suspended piezoelectric material between the parallel plates 74 and 76 provides direct coupling of input signal energy to generate subharmonic modes of acoustic vibration in the material when the input signal exceeds the critical threshold value for the material.

The bridge is adjusted so as to be balanced at high signal levels. For signal levels below the subharmonic threshold the impedance presented by the resonator assumes a constant small signal value, unbalancing the bridge and providing the desired linear input-output relationship at such levels. When a signal above the threshold level is applied simultaneously with signals below the threshold level, it is found that no appreciable interaction occurs between the larger and smaller signals unless signal frequency differences on the order of a few hundred cycles or less exist.

Both the magnetostrictive and the piezoelectric embodiments of the invention are constructed with the resonator and coupling circuit tuned so that the resonator is capable of resonance at a large number of different frequencies equal to one-half of the applied input signal frequencies, with conditions such that ordinary magnetic resonance at the applied frequencies does not occur. Under these conditions, systems according to the invention provide highly frequency-selective limiting for frequencies in the microwave range and below.

Other features, objects and advantages of the invention will be recognized by those skilled in the art.

We claim as our invention:

1. A frequency-selective limiter comprising a coupling circuit having directly coupled input and output terminals and tuned to pass input signal frequency components within a predetermined frequency band, said circuit including means for generating a magnetic field which varies in intensity in accordance with variations in an applied input signal, a body of magnetostrictive material immersed in said field and responsive to field intensities corresponding to input signal components exceeding a predetermined threshold value to undergo acoustic resonance in a plurality of modes simultaneously only at subharmonic frequencies which are substantially equal, respectively, to one-half of the frequency of a signal frequency component within said band, and means supporting said body for substantially free acoustic vibration in said modes.

2. A frequency-selective limiter comprising a coupling circuit having directly coupled input and output terminals, electric signal responsive circuit means connected to said input and output terminals for generating a uniform field varying in intensity in accordance with an applied input signal consisting of a plurality of signal components having frequencies within a predetermined frequency band, and a body of material supported within said field with said field applied substantially uniformly over the volume thereof, said material being capable of responding to field intensities exceeding a predetermined threshold value by exhibiting substantially only subharmonic acoustic modes of vibration at frequencies which are equal to one-half of the frequency of a signal frequency component within said band corresponding to field intensities exceeding said value.

3. The frequency-selective limiter defined in claim 2 wherein said circuit means comprises a coil responsive to the input signal and operable to generate said field, means for generating a magnetic bias field superimposed upon and oriented parallel to the field of said coil, and wherein said body of material comprises a magnetostrictive material surrounded by said coil.

4. The frequency-selective limiter defined in claim 2 wherein said circuit means includes a pair of spaced parallel plates generating an electric field therebetween in which said body of material is supported, and wherein said body of material comprises a piezoelectric material.

5. A frequency-selective limiter comprising in combination: electrically coupled input and output circuits; and electromechanical resonator including electric circuit means electrically connected to said input and to said output circuits for generating a uniform field varying in intensity in accordance with an applied input signal, a resonant body, and means supporting said body for substantially free acoustic vibration within said field, said body consisting of material which is deformable by said field and in response to field intensities exceeding a predetermined threshold value said body experiences acoustic oscillations in a plurality of modes substantially only at frequencies which are substantially equal, respectively, to one-half of the frequency of a signal frequency component within the input signals applied to said input circuit.

6. A frequency-selective limiter comprising an electromechanical resonator and a circuit coupled thereto having input and output terminals, said resonator including electric circuit means for generating a uniform field proportional to a signal applied at said input terminals, a body of material which is deformed by said field and having a characteristic response whereby in response to field intensities applied thereto exceeding a predetermined level said material experiences resonance at a plurality of subharmonic frequencies which are substantially equal, respectively, to one-half of the frequency of a signal frequency component contained in said field and exceeding said level, means supporting said body within said field for substantially free acoustic resonance in a plurality of modes simultaneously, said modes corresponding respectively to said subharmonic frequencies.

7. The frequency-selective limiter defined in claim 6 wherein said body comprises magnetostrictive material and said field generating means comprises means for generating a magnetic field.

8. The frequency-selective limiter defined in claim 6 wherein said body comprises piezoelectric material and said field generating means comprises means for generating an electric field.

9. The apparatus of claim 7 including magnetic field means providing a magnetic bias field parallel to and superimposed on said first named magnetic field.

10. A frequency-selective limiter comprising a coupling circuit having directly coupled input and output terminals and tuned to pass input signal frequency components within a predetermined frequency band, said circuit including means for generating an electric field which varies in intensity in accordance with variations in an applied input signal, a body of piezoelectric material immersed in said field and responsive to field intensities corresponding to input signal components exceeding a predetermined threshold value to undergo acoustic resonance in a plurality of modes simultaneously only at subharmonic frequencies which are substantially equal, respectively, to one-half of the frequency of a signal frequency component within said band, and means supporting said body for substantially free acoustic vibration in said modes.

References Cited

UNITED STATES PATENTS 2,876,419 3/1959 Gianola.
3,378,760 4/1968 Jackson et al. -------- 324—0.5
3,253,166 5/1966 Osial et al. -------- 310—8.1 X HERMAN KARL SAALBACH, Primary Examiner P. L. GENSLER, Assistant Examiner U.S. Cl. X.R.

333—24.2, 72